(12) United States Patent  
Lin

(10) Patent No.: US 8,245,058 B2  
(45) Date of Patent: Aug. 14, 2012

(54) SERIAL PORT CONNECTOR WITH POWER OUTPUT FUNCTION

(75) Inventor: Ming-Cheng Lin, Taipei County (TW)

(73) Assignee: Sunix Co., Ltd., Sindian, Taipei County (TW)

( * ) Notice: Subject to any disclaimer, the term of this patent is extended or adjusted under 35 U.S.C. 154(b) by 271 days.

(21) Appl. No.: 12/761,408

(22) Filed: Apr. 16, 2010

(65) Prior Publication Data

US 2011/0258357 A1    Oct. 20, 2011

(51) Int. Cl.  
*G06F 1/26* (2006.01)

(52) U.S. Cl. .................................. 713/300; 710/316

(58) Field of Classification Search .............. 713/300; 710/316  
See application file for complete search history.

(56) References Cited

U.S. PATENT DOCUMENTS

| | | | | |
|---|---|---|---|---|
| 5,514,859 | A * | 5/1996 | Seigel | 235/462.15 |
| 6,304,934 | B1 * | 10/2001 | Pimenta et al. | 710/305 |
| 6,633,998 | B1 * | 10/2003 | Lau | 714/22 |
| 7,852,873 | B2 * | 12/2010 | Bird | 370/463 |
| 2004/0223180 | A1 * | 11/2004 | Brooks | 358/1.15 |

\* cited by examiner

*Primary Examiner* — Glenn A Auve  
(74) *Attorney, Agent, or Firm* — patenttm.us

(57) ABSTRACT

A serial port connector with power output function includes a serial port having a plurality of pins. Under the existing EIA-RS-232, EIA-RS-422, and EIA-RS-485 standards for connectors, the definition of the pins of the serial port are altered, so that a pin that was originally defined as floating or for serial data communication signal is now changed to a power output specification. Thus, when the connector is connected via the same one cable to a serial port peripheral device, the connector can provide both functions of serial data communication signal transmission and power transmission to thereby largely increase the usability of the connector.

18 Claims, 2 Drawing Sheets

SERIAL PORT CONNECTOR WITH POWER OUTPUT FUNCTION

BACKGROUND OF THE INVENTION

1. Field of the Invention

The present invention relates to a serial port connector with power output function, and more particularly to a connector that can be used as means for both signal transmission and power supplying.

2. Description of the Prior Arts

It is a very common technique in the existing electronic industry to use a connector between the connecting ends of two separated electronic devices as a bridge to connecting the two electronic devices to each other for signal and data transmission. EIA-RS-232, EIA-RS-422 and EIA-RS-485 are serial data communications interface standards established by the Electronic Industries Alliance of USA, and are widely applied in the connection of a computer serial interface to an external device. However, in these standards, there is not defined any standard for power output to an externally connected device. In lack of such standard, the difficulty in design and site wiring is increased and the connectors could not be used conveniently. It is therefore tried by the inventor to develop a connector that allows a user to flexibly set the serial port connector to a power output specification while complies with the existing EIA-RS-232, EIA-RS-422 and EIA-RS-485 standards for connectors.

SUMMARY OF THE INVENTION

A primary object of the present invention is to provide a serial port connector with power output function, so as to overcome the problems in the conventional serial port connectors.

To achieve the above and other objects, the serial port connector with power output function according to the present invention includes a serial port having a plurality of pins. Under the existing EIA-RS-232, EIA-RS-422, and EIA-RS-485 standards for connectors, the definition of the pins of the serial port are altered, so that a pin that was originally defined as floating or for serial data communication signal is now changed to a power output specification. Thus, when the connector is connected via the same one cable to a serial port peripheral device, the connector can provide both functions of serial data communication signal transmission and power transmission to thereby largely increase the usability of the connector.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the arrangement of a serial port connector with power output function according to a preferred embodiment of the present invention.

DETAILED DESCRIPTION OF THE PREFERRED EMBODIMENTS

The present invention will now be described with a preferred embodiment thereof. It is understood the accompanying drawings are illustrated only for assisting in describing the present invention and is not necessarily in compliance with the exact or precise size proportion and component arrangement of a real product manufactured through implementing the present invention. Therefore, the size proportion and component arrangement shown in the accompanying drawings are not intended to limit the present invention, which is intended to be limited only by the appended claims.

Figure 1:
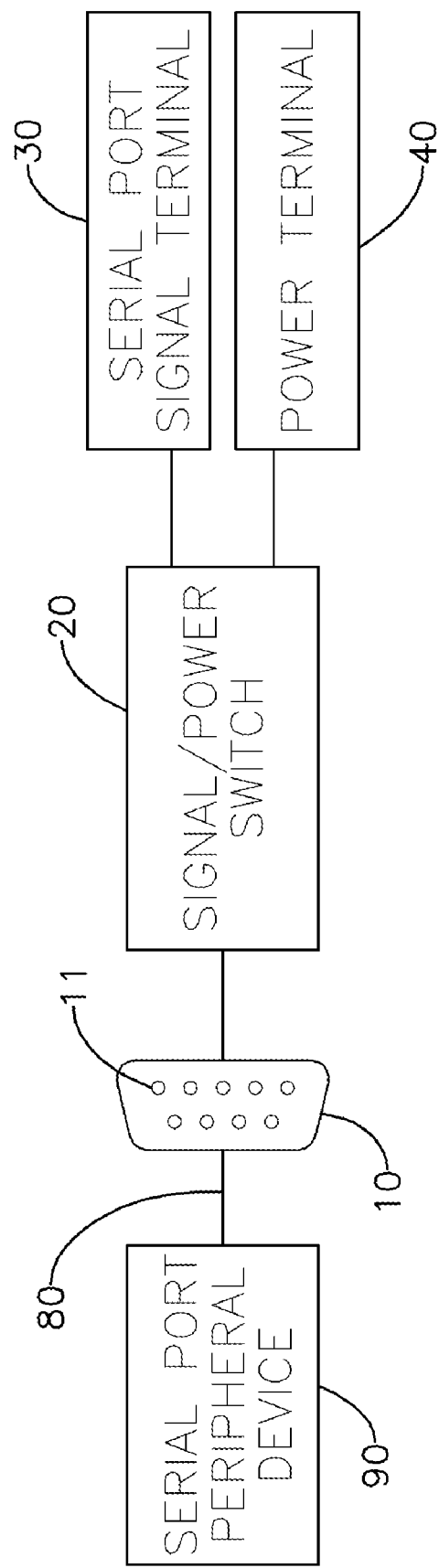

Please refer to FIG. 1. A serial port connector with power output function according to a preferred embodiment of the present invention includes a serial port 10, a signal/power switch 20, a serial port signal terminal 30, and a power terminal 40.

The serial port 10 can be a DB-9 serial port having nine pins 11 or a DB-25 serial port having twenty-five pins in compliance with the existing serial data communications interface standards, and can be electrically connected via a cable 80 to a serial port peripheral device 90 to enable transmission of both serial data communication signal and power.

Figure 2:
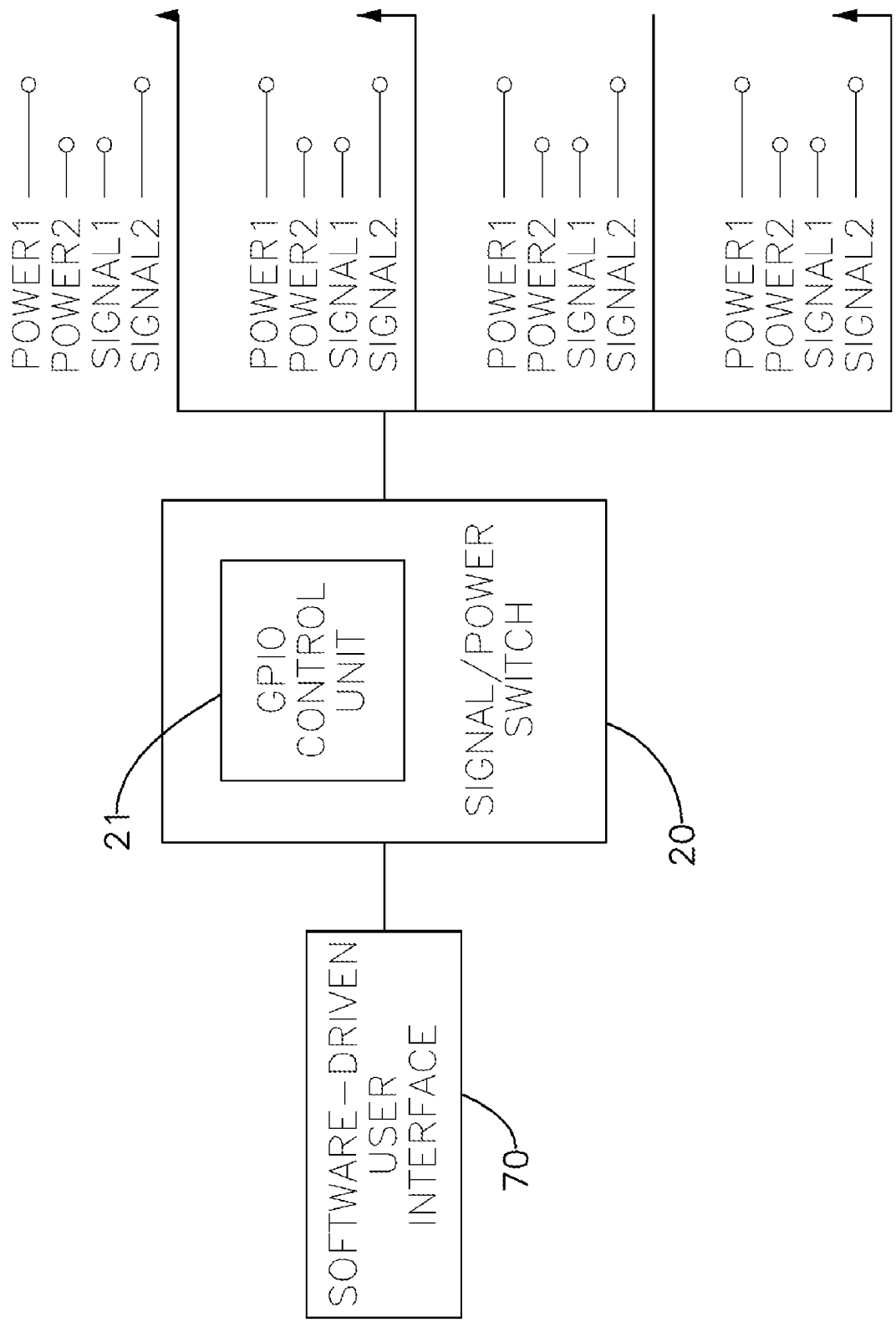
FIG. 2 shows the implementation of part of the components of the serial port connector of the present invention.

The signal/power switch 20 is electrically connected to one of the pins 11 of the serial port 10, and can be a jumper selector. Please also refer to FIG. 2. As shown, the signal/power switch 20 can further include a general purpose input/output (GPIO) control unit 21 for further connecting the signal/power switch 20 to a software-driven user interface 70, so that a user can drive the signal/power switch 20 to make jumper selection through operation on a computer operating system. Via jumper selection, the pin 11 connected to the signal/power switch 20 can be switched to output signal or output power.

The serial port signal terminal 30 is electrically connected to one of two jumper selection ends on the signal/power switch 20 for outputting serial data communication signal.

The power terminal 40 is electrically connected to the other jumper selection end on the signal/power switch 20 for outputting power. Power can be inputted to the power terminal 40 via a power adapter, i.e., the power is directly inputed via an external AC-to-DC adapter. Meanwhile, different voltage and current requirements can be flexibly selected via different power adapters.

Alternatively, power can be inputted to the power terminal 40 via a bus on a computer mainboard, i.e., the power is obtained from a standard bus on the mainboard, such as an ISA (Industry Standard Architecture), a PCI (Peripheral Component Interconnect), a PCI Express, an ExpressCard, a PCMCIA (Personal Computer Memory Card International Association), a USB (Universal Serial Bus), or a 1394 bus on the mainboard. However, since direct current (DC) power output by the bus is limited, such as 3.3 VDC, 5 VDC, or 12 VDC, power conversion circuit design can be adopted in the present invention to increase or reduce the voltage, so as to meet the power requirement of the peripheral serial port device 90.

Alternatively, power can be inputted to the power terminal 40 via an electronic computer power supply, i.e., the power can be obtained from a power supply of a personal computer (PC). However, since DC power output by the power supply of the PC is limited, such as 3.3 VDC, 5 VDC, 12 VDC, or 24 VDC, power conversion circuit design can be adopted in the present invention to increase or reduce the voltage, so as to meet the power requirement of the peripheral serial port device 90.

The present invention flexibly employs the standards defined by the EIA (Electronic Industries Alliance), so that power can be output via the pin 11 in the serial port 10 of the connector to the peripheral serial port device 90. The present invention is mainly characterized in that it allows a user to flexibly set the pin 11 in the serial port 10 of a connector to output power or signal via selection using the simplest hardware switch or via control of upper-level software, so that the user can conveniently apply the connector to different peripheral serial port devices 90.

When the current required by the peripheral serial port device 90 is to be supplied by the power terminal 40, it is necessary to determine the current capacity of the cable 80 and give the cable 80 proper protection, lest the problem of current overload should occur. Further, to prevent the problem of backflow current caused by short circuit in the peripheral serial port device 90, and accordingly, undesirable damage of system apparatus, the present invention pays high attention to the power circuit protection and includes protection design for the pin 11 of the serial port 10, via which signal and power are input to the connector. The protection can include, for example, the use of an optical coupler, a diode tube, or a fuse to isolate the system's internal components from external devices, so as to ensure full isolation of internal system end from the peripheral serial port device 90 and exact protection of the system.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A serial port connector with power output function, comprising:
    a serial port having a plurality of pins and being electrically connected via a cable to a peripheral serial port device to enable transmission of both serial data communication signal and power;
    a signal/power switch being electrically connected to one of the pins of the serial port; the signal/power switch being a jumper selector, and, via jumper selection with the jumper selection, the pin connected to the signal/power switch is switched to output signal or output power;
    a serial port signal terminal being electrically connected to one of two jumper selection ends on the signal/power switch for outputting serial data communication signal; and
    a power terminal being electrically connected to the other jumper selection end on the signal/power switch for outputting power.

2. The serial port connector with power output function as claimed in claim 1, wherein the serial port is in the form of a DB-9 serial port having nine pins.

3. The serial port connector with power output function as claimed in claim 2, wherein the signal/power switch further includes a general purpose input/output (GPIO) control unit for further connecting the signal/power switch to a software-driven user interface, allowing a user to drive the signal/power switch to make jumper selection via operation on a computer operating system.

4. The serial port connector with power output function as claimed in claim 2, wherein power is directly inputted to the power terminal via an external AC-to-DC adapter; and different voltage current requirements can be flexibly selected via different power adapters.

5. The serial port connector with power output function as claimed in claim 2, wherein power is inputted to the power terminal from a standard bus on a computer mainboard, and a voltage of the power can be increased or reduced via power conversion circuit design.

6. The serial port connector with power output function as claimed in claim 2, wherein power is inputted to the power terminal via an electronic computer power supply, and a voltage of the power can be increased or reduced via power conversion circuit design.

7. The serial port connector with power output function as claimed in claim 2, wherein the serial port further includes a protection design, in which the protection design is chosen from one of a group consisted of an optical coupler, a diode tube and a fuse.

8. The serial port connector with power output function as claimed in claim 1, wherein the serial port is in the form of a DB-25 serial port having twenty-five pins.

9. The serial port connector with power output function as claimed in claim 8, wherein the signal/power switch further includes a general purpose input/output (GPIO) control unit for further connecting the signal/power switch to a software-driven user interface, allowing a user to drive the signal/power switch to make jumper selection via operation on a computer operating system.

10. The serial port connector with power output function as claimed in claim 8, wherein power is directly inputted to the power terminal via an external AC-to-DC adapter; and different voltage current requirements can be flexibly selected via different power adapters.

11. The serial port connector with power output function as claimed in claim 8, wherein power is inputted to the power terminal from a standard bus on a computer mainboard, and a voltage of the power can be increased or reduced via power conversion circuit design.

12. The serial port connector with power output function as claimed in claim 8, wherein power is inputted to the power terminal via an electronic computer power supply, and a voltage of the power can be increased or reduced via power conversion circuit design.

13. The serial port connector with power output function as claimed in claim 8, wherein the serial port further includes a protection design, in which the protection design is chose from one of a group consisted of an optical coupler, a diode tube and a fuse.

14. The serial port connector with power output function as claimed in claim 1, wherein the signal/power switch further includes a general purpose input/output (GPIO) control unit for further connecting the signal/power switch to a software-driven user interface, allowing a user to drive the signal/power switch to make jumper selection via operation on a computer operating system.

15. The serial port connector with power output function as claimed in claim 1, wherein power is directly inputted to the power terminal via an external AC-to-DC adapter; and different voltage current requirements can be flexibly selected via different power adapters.

16. The serial port connector with power output function as claimed in claim 1, wherein power is inputted to the power terminal from a standard bus on a computer mainboard, and a voltage of the power can be increased or reduced via power conversion circuit design.

17. The serial port connector with power output function as claimed in claim 1, wherein power is inputted to the power terminal via an electronic computer power supply, and a voltage of the power can be increased or reduced via power conversion circuit design.

18. The serial port connector with power output function as claimed in claim 1, wherein the serial port further includes a protection design, in which the protection design is chose from one of a group consisted of an optical coupler, a diode tube and a fuse.

* * * * *